United States Patent
Jiang et al.

(10) Patent No.: US 12,521,709 B2
(45) Date of Patent: Jan. 13, 2026

(54) PROCESS FOR PURIFYING ORGANIC SOLVENTS

(71) Applicant: Dow Global Technologies LLC, Midland, MI (US)

(72) Inventors: Qi Jiang, Shanghai (CN); Kaoru Ohba, Tokyo (JP)

(73) Assignee: Dow Global Technologies LLC, Midland, MI (US)

( * ) Notice: Subject to any disclaimer, the term of this patent is extended or adjusted under 35 U.S.C. 154(b) by 1013 days.

(21) Appl. No.: 17/594,902

(22) PCT Filed: Jul. 4, 2019

(86) PCT No.: PCT/CN2019/094706
§ 371 (c)(1),
(2) Date: Nov. 2, 2021

(87) PCT Pub. No.: WO2021/000318
PCT Pub. Date: Jan. 7, 2021

(65) Prior Publication Data
US 2025/0186988 A1    Jun. 12, 2025

(51) Int. Cl.
*B01J 47/04* (2006.01)
*B01D 15/36* (2006.01)
*B01J 39/07* (2017.01)
*B01J 41/07* (2017.01)

(52) U.S. Cl.
CPC ............ *B01J 47/04* (2013.01); *B01D 15/362* (2013.01); *B01D 15/363* (2013.01); *B01J 39/07* (2017.01); *B01J 41/07* (2017.01)

(58) Field of Classification Search
CPC . B01J 47/04; B01J 41/07; B01J 39/07; B01D 15/362; B01D 15/363
See application file for complete search history.

(56) References Cited

U.S. PATENT DOCUMENTS

| | | | |
|---|---|---|---|
| 3,972,810 A | 8/1976 | Chopra | |
| 4,525,483 A | 6/1985 | Grier et al. | |
| 5,192,446 A | 3/1993 | Salem et al. | |
| 5,292,493 A | 3/1994 | Audeh et al. | |
| 5,518,628 A | 5/1996 | Carey | |
| 6,123,850 A | 9/2000 | Commarieu et al. | |
| 6,569,910 B1 | 5/2003 | Spindler et al. | |
| 7,329,354 B2 | 2/2008 | Mullee | |
| 10,913,058 B2 * | 2/2021 | Ohba | B01J 41/12 |
| 2019/0009267 A1 | 1/2019 | Ohba et al. | |
| 2025/0041823 A1 * | 2/2025 | Qian | B01J 20/165 |

FOREIGN PATENT DOCUMENTS

| | | | | |
|---|---|---|---|---|
| JP | H01228560 A | 9/1989 | | |
| JP | 2009057286 A | 3/2009 | | |
| JP | 5096907 B2 | 12/2012 | | |
| WO | 2017/116755 A1 | 7/2017 | | |
| WO | WO-2017116759 A1 * | 7/2017 | | B01D 15/00 |
| WO | WO-2018192195 A1 * | 10/2018 | | C07C 67/56 |

OTHER PUBLICATIONS

Kamata, Journal of The Chemical Society of Japan, 1977, vol. 50, p. 532-536.
Pietrzyk, Talanta, 1969, vol. 16, p. 169-179.
Bodamer, Ind. Eng. Chem., 1953, vol. 45, No. 1, p. 2577-2580.
PCT/CN2019/094706, International Search Report and Written Opinion with a mailing date of Apr. 8, 2020.
Extended European Search Report, reference: 19936166.8 with a mailing date of Mar. 1, 2023.

* cited by examiner

*Primary Examiner* — Haidung D Nguyen
(74) *Attorney, Agent, or Firm* — Arthur R. Rogers

(57) ABSTRACT

A process for purifying (i) a hydrophilic organic solvent, (ii) a hydrolysable organic solvent, or (iii) a mixture of a hydrophilic organic solvent and a hydrolysable organic solvent by removing ionic contaminants from the hydrophilic organic solvent, from the hydrolysable organic solvent, or from the mixture of a hydrophilic and a hydrolysable organic solvent without generation of by-product impurities, the process including the steps of contacting the hydrophilic organic solvent, the hydrolysable organic solvent, or the mixture of hydrophilic and hydrolysable organic solvents with a mixed bed of ion exchange resin; wherein the mixed bed of ion exchange resin includes a mixture of: (a) a weak-acid cationic ion exchange resin and (b) a weak-base anionic ion exchange resin.

10 Claims, No Drawings

PROCESS FOR PURIFYING ORGANIC SOLVENTS

FIELD

The present invention relates to a process for purifying an organic solvent by removing contaminants from the organic solvent; and more specifically, the present invention relates to a process for removing metallic and non-metallic ionic contaminants from a hydrophilic organic solvent, from a hydrolysable solvent and/or from a mixture of a hydrophilic organic solvent and a hydrolysable organic solvent by using an ion-exchange resin.

BACKGROUND

A pure solvent, that is, a solvent which is free of ionic contaminants, is typically required for many industrial purposes such as for the manufacture of pharmaceuticals and electronic materials. For example, organic solvents with a very low level of metallic ion contaminants are required for semiconductor fabrication processes, because metallic ion contaminants negatively affect the performance and production yield of the fabricated semiconductor devices. Some hydrophilic organic solvents, such as propylene glycol methyl ether (PGME), and hydrolysable solvents, such as propylene glycol methyl ether acetate (PGMEA), are commonly used for lithography processes in semiconductor fabrication processes. And, when those organic solvents are to be used in semiconductor fabrication processes, it is desired that such solvents have a very low level (e.g., less than 50 parts per trillion [ppt]) of metallic ion contaminants.

Heretofore, some ion exchange resins have been used for purifying various organic solvents by removing metallic ionic contaminants from the organic solvents. And, the purification of organic solvents using ion exchange technology has been applied to organic solvents which are used in manufacturing electronic materials. For example, references that disclose a process for purifying an organic solvent using an ion exchange resin include JP1989228560B; JP2009057286A; JP5,096,907B; and U.S. Pat. Nos. 7,329,354; 6,123,850; and 5,518,628.

However, the above previously known processes for purifying an organic solvent by ion exchange resin are ineffective for removing sufficient ionic contaminants to achieve a quite high level of purity of solvent (i.e., a purity such that the level of metallic ion contaminants in the solvent is at a level of less than 50 parts per billion [ppb]); and/or, the above previously known processes cause various chemical reactions to generate impurities such that a purity loss in the resulting organic solvent may happen. Thus, the resulting organic solvent purified according to the previously known processes are not suitable for applications requiring a high level of purity. For example, hydrolysis of an ester type solvent and an amide type solvent is well-known to negatively impact the solvent using a conventional ion exchange process; and particularly in electronics processing applications, an acidic substance is generated as the result of hydrolysis decomposition of the ester type solvent, and such acidic substance negatively impacts the photo reaction of photo resists. Also, both the ester type solvent and the amide type solvent tend to generate aldehydes or ketones as undesirable by-products of an ion exchange reaction. Therefore, a process for removal of a high level of ionic contaminants from an organic solvent without chemical damage of the treated solvent by an ion exchange resin is highly desirable.

SUMMARY

The present invention is directed to a process for purifying (1) a hydrophilic organic solvent, (2) a hydrolysable organic solvent, or (3) a mixture of a hydrophilic organic solvent and a hydrolysable organic solvent by treating the solvent(s) using an ion-exchange resin.

In one embodiment, the present invention includes to a process for removing ionic contaminants from (1) a hydrophilic organic solvent, (2) a hydrolysable organic solvent, or (3) a mixture of a hydrophilic organic solvent and a hydrolysable organic solvent using an ion-exchange resin without generating by-product impurities; and by using the process of the present invention, an ultrapure solvent is obtained.

In another embodiment, the process of the present invention includes the steps of: (a) preparing a mixed bed of ion exchange resin comprising a cationic ion exchange resin and an anionic ion exchange resin, wherein the cationic ion exchange resin is a weak-acid cationic ion exchange resin; and wherein the anionic ion exchange resin is a weak-base anionic ion exchange resin; and (b) contacting (1) a hydrophilic organic solvent, (2) a hydrolysable organic solvent, or (3) a mixture of a hydrophilic organic solvent and a hydrolysable organic solvent with the mixed bed of ion exchange resin of step (a).

Generally, the initial concentration of metal contaminants such as Na, K, Ca, Al, Fe, Ni, Zn, Cu, Cr and Sn are 1.0 ppb or less, respectively when solvent is manufactured. And, one objective of the present invention is to provide higher metal removal efficiency (for example, to achieve a metal level of contaminants in the ion-exchange resin of less than 100 ppt metal level) in (1) a hydrophilic organic solvent, (2) a hydrolysable organic solvent, or (3) a mixture of a hydrophilic organic solvent and a hydrolysable organic solvent using a mixed bed of ion exchange resins including a weak-acid cationic ion exchange resin and a weak-base anionic ion exchange resin in combination.

In some embodiments, one of the benefits of using the mixed bed of ion exchange resins of the present invention includes, for example, the capability of avoiding impurity generation in the organic solvents being subjected to the ion exchange resins without decreasing the ion exchange ability of the mixed bed of ion exchange resins.

In other embodiments, another benefit of using the process of the present invention includes, for example, the ability to solve the decoloring problem of some resin combinations.

Various embodiments of the present invention are described in more detail in the following Detailed Description.

DETAILED DESCRIPTION

As used throughout this specification, the abbreviations given below have the following meanings, unless the context clearly indicates otherwise: BV/hr=bed volume/hour(s), μm=micron(s), nm=nanometer(s), g=gram(s); mg=milligram(s); L=liter(s); mL=milliliter(s); ppm=parts per million; ppb=parts per billion; ppt=parts per trillion; m=meter(s); mm=millimeter(s); cm=centimeter(s); min=minute(s); s=second(s); hr=hour(s); ° C.=degree(s) Celsius; %=percent, vol %=volume percent; and wt %=weight percent.

In general, the process of the present invention is a process for purifying organic solvents; and particularly for purifying: (1) a hydrophilic organic solvent, (2) a hydrolysable organic solvent, or (3) a mixture of a hydrophilic organic solvent and a hydrolysable organic solvent to produce: (1) an ultrapure hydrophilic organic solvent, (2) an ultrapure hydrolysable organic solvent, or (3) an ultrapure mixture of a hydrophilic organic solvent and a hydrolysable organic solvent.

As used herein, a "hydrophilic organic solvent" means an organic solvent that is completely water-miscible. Hydrophilic organic solvents include but are not limited to, for example, propylene glycol methyl ether, dipropylene glycol methyl ether, tripropylene glycol methyl ether, propylene glycol ethyl ether, propylene glycol propyl ether, ethylene glycol propyl ether, ethylene glycol butyl ether, diethylene glycol methyl ether, diethylene glycol ethyl ether, diethylene glycol propyl ether, diethylene glycol butyl ether, ethanol, isopropanol, and the like; and mixtures thereof.

As used herein, an "ultrapure hydrophilic organic solvent" means a hydrophilic organic solvent wherein the purity of such organic solvent is greater than 99.9 percent (%) with less than 0.1% impurities that includes isomers and other impurities. Other impurities may include reactive impurities such as acids, peroxides, carbonyls, and mixtures thereof. And, the metal content of such organic solvent is less than 100 ppt. Ultrapure hydrophilic organic solvents include but are not limited to, for example, any one or more of the hydrophilic organic solvents described above with a purity of greater than 99.9 percent and a metal content of less than 100 ppt.

As used herein, a "hydrolysable organic solvent" means a solvent including a compound which may be decomposed to acid and base components by water with or without a catalyst. Hydrolysable organic solvents include but are not limited to, for example, esters, amides, carbonates, and mixtures thereof. Examples of esters useful in the present invention include propylene glycol methyl ether acetate (PGMEA), ethyl lactate, butyl lactate, ethyl acetate, butyl acetate, diethylene glycol mono ethyl ether acetate, diethylene glycol mono butyl ether acetate, propylene glycol diacetate, ethyl 3-ethoxy propionate, gamma-butylolactone, and mixtures thereof. Examples of amides useful in the present invention include N-methylpyrrolidone, dimethyl formamide, dimethyl acetoamide, 3-methoxy-N,N-dimethyl propion amide, N-(2-hydroxyethyl) propion amide, gamma butylolactam, and mixtures thereof. Examples of carbonates useful in the present invention include ethylene carbonate, propylene carbonate, dimethyl carbonate, diethyl carbonate, and mixtures thereof.

As used herein, an "ultrapure hydrolysable organic solvent" means a hydrolysable organic solvent wherein the purity of such organic solvent is greater than 99.9 percent with less than 0.1% impurities that includes isomers and other impurities. Other impurities may include reactive impurities such as acids, peroxides, carbonyls, and mixtures thereof. And, the metal content of such organic solvent is less than 100 ppt. Ultrapure hydrolysable organic solvents include but are not limited to, for example, any one or more of the hydrolysable organic solvents described above with a purity of greater than 99.9 percent and a metal content of less than 100 ppt As used herein, an "ultrapure mixture of hydrophilic and hydrolysable organic solvents" means mix solvents of hydrophilic solvent as defined above and hydrolysable solvent as defined above, wherein the purity of such organic solvents are greater than 99.9 percent and the metal content of such organic solvent is less than 100 ppt throughout the shelf life period of the organic solvent.

When a mixture of solvents is to be purified, such as a mixture of hydrophilic and hydrolysable solvents, the solvent ratio of hydrophilic and hydrolysable solvents includes, for example, from 1/99 to 99/1 in embodiment, from 5/95 to 95/5 in another embodiment, and from 10/90 to 90/10 in still another embodiment. As an illustration of the present invention process, and not to be limited thereby, the ratio of a hydrophilic/hydrolysable solvent blend such as PEME/PGMEA blend can be for example 99/1 in one embodiment, 95/5 in another embodiment, 90/10 in still another embodiment, 80/20 in yet another embodiment, 70/30 in even still another embodiment, and 1/99 in even yet another embodiment.

The process of the present invention includes the use of a mixed bed of ion exchange resin. A mixed bed of ion exchange resin refers to a mixture of at least: (1) a cationic ion exchange resin and (2) an anionic ion exchange resin. The cationic ion exchange resin used in the mixed bed of ion exchange resin is a weak-acid cationic ion exchange resin. The anionic ion exchange resin used in the mixed bed of ion exchange resin is a weak-base anionic ion exchange resin.

It is commonly known that the degree of swelling of a gel-type resin is dependent on a solubility parameter of solvents; and that a macroreticular (MR)-type resin is dimensionally stable in an organic solvent, for example, as described in "Behavior of Ion Exchange Resins in Solvents Other Than Water—Swelling and Exchange Characteristics", George W. Bodamer, and Robert Kunin, Ind. Eng. Chem., 1953, 45 (11), pp 2577-2580. In one preferred embodiment, an ion exchange resin useful in the present invention that exhibits "dimensional stability" refers to an ion exchange resin wherein the volume of the soaked ion exchange resin in an organic solvent changes less than ±10 percent compared to the volume change of the soaked resin in water (i.e., a hydrated resin).

Not to be limited to any particular theory, in the case of a gel-type resin, metal ions are assumed to be trapped on the surface of the ion exchange beads first, and then the metal ions are assumed to diffuse into the inside of polymer beads. Ion exchange capacity known by those skilled in the art from product technical sheets for ion exchange resins are expressed in chemical equivalent/unit volume regardless of where ion exchange sites are located in the resin beads. When ion exchange capacity can be fully utilized, metal removal capability and capacity are maximized. Solvent absorbed in the resin beads carries metal ions into the inside of the resin bead. If the ion exchange resin bead does not absorb solvent and resin molecules are tightly packed, metal ions cannot migrate into inside of polymer beads. The degree of resin swelling indicates how much solvent is absorbed. Since gel type ion exchange resins are designed to contain water at 40% to approximately (~) 60% of the hydrated resin bead (i.e., ion exchange resins inherently have a strong affinity to water or water miscible solvents), swelling of the ion exchange resin will become less obvious as hydrophobicity of solvents increased, for example, as the ratio of hydrophilic solvent of the mixed resin is decreased. When there is a lack of presence of solvent in the resin beads, ion exchange sites located in inside of the resin beads cannot be utilized in ion exchange reactions. This results in a degradation of metal removal efficiency and metal removal capacity. In an extreme case, only ion exchange sites located on the resin beads' surface are active in contact with a hydrophobic solvent.

For the case of an MR-type resin, the resin has more surface area because of macro-pores located on the bead surface; the principle being that ion exchange reactions takes place mainly at the pores located on the resin bead surface. Also, to prevent corruption of the macro-pore structures of the resins, the resins are designed to stabilize the dimension and the surface morphology of resin beads. A benefit of using an MR-type resin is that even a hydrophobic solvent has a minimal deleterious impact on the size and surface morphology of the ion exchange resin; and as a result, the number of ion exchange sites that can be utilized for metal removal are not changed by hydrophobicity of solvent, in other words, by ratio of the hydrophilic solvent and the hydrolysable solvent in mix solvent.

Therefore, an MR-type ion exchange resin is used for the weak-acid cationic ion exchange resin and for the weak-base anionic ion exchange resin used in the mixed resin bed of the present invention process. The matrix material of the MR-type resins, can be selected from a cross linked styrene-divinyl benzene copolymer (styrene-DVB), an acrylic (methacrylic) acid-divinyl benzene copolymer; or mixtures thereof.

The weak-acid cationic ion exchange resin useful in the present invention includes, for example, a cationic ion exchange resin with at least one kind of weak-acid functionality such as weak-acid carboxylic acid groups, weak-acid phosphoric acid groups, weak-acid phenolic groups, and mixtures thereof. As used herein, such groups are called "weak-acid group(s)".

Exemplary of some of the commercial weak-acid cationic ion exchange resins useful in the present invention include, for example, AMBERLITE™ IRC76 and DOWEX™ MAC-3 (both of which are available from Dupont); and mixtures thereof.

The weak-base anionic ion exchange resin useful in the present invention includes, for example, an anionic ion exchange resin with at least one kind of weak-base functionality such as primary, secondary or tertiary amine (typically, dimethyl amine) groups, or mixtures thereof. As used herein, such groups are called "weak-base group(s)".

Exemplary of some of the commercial weak-base anionic ion exchange resins useful in the present invention include, for example AMBERLITE™ IRA98, AMBERLITE™ 96SB, and AMBERLITE™ XE583 as examples of a MR-type styrene polymer matrix; and AMBERLITE™ IRA67 as an example of a gel-type acrylic polymer matrix (all of which are available from Dupont); and mixtures thereof.

In one preferred embodiment, using a weak-acid cationic ion exchange resin in the mixed resin bed of the present invention can minimize the organic impurities generated from side-reactions of ion exchange.

Weak-acid cationic ion exchange resin groups, in general, have a lower affinity to metal cationic ions than strong-acid cationic ion exchange resin groups. It has been found that the metal removal efficiency of the weak-acid cationic ion exchange resin groups is lower than the strong-acid cationic ion exchange resin groups when the weak-acid cationic ion exchange resin is used as single bed. Also, it has been found that by mixing the weak-acid cationic ion exchange resin with the weak-base anionic ion exchange resin, an excellent metal removal capability from both hydrophilic solvent and hydrolysable solvent can be achieved.

One of the benefits of using a mixed resin bed of cation exchange resin and anion exchange resin is that such mixed resin bed provides a higher capability of removing metal from solvent than a single cation exchange resin bed. The mechanism of metal ion removal is a cation exchange reaction. When a metal ion is absorbed in a cation exchange resin, a proton is released. Since the ion exchange reaction is an equilibrium reaction, by removing a proton from the reaction system, a high efficiency of metal ion removal can be achieved. Also, the free proton can cause various side-reaction. In the mixed resin bed, the proton is neutralized and removed from the reaction system thanks to the effect of the anion exchange resin. Counter anions are typically present together with metal cations. For the case of strong base anion exchange resin, the anion exchange resin can absorb the counter anion and release hydroxyl ions, and the protons released from cation exchange reaction react with the hydroxyl ions released from anion exchange reaction, and form water molecules. However, water can be fuel for hydrolysis reaction if the water is added to a hydrolysable solvent.

An advantage of using a mix resin formulation containing a weak-base anionic ion exchange resin includes, for example, such mixed resin bed minimizes the hydrolysis decomposition of hydrolysable solvent. When a solvent to be purified is contacted with a cationic ion exchange resin, protons are released as usual, and the released protons associate with unshared electron pairs of the nitrogen atoms within the weak-base group. By absorbing protons, the weak-base group has a positive electron charge. Then an anionic impurity is bound to the weak-base group due to the charge neutral requirement. Consequently, undesired components such as water are not generated by the purification process of the present invention. Thus, using the weak-base anionic ion exchange resin in a mixed bed of ion exchange resin provides purification of hydrolysable organic solvents without undesirable hydrolysis.

An advantage of using a mix resin formulation containing a weak-acid cationic ion exchange resin includes, for example, such mixed resin bed minimizes the risk of hydrolysis decomposition which can be caused by cationic ion exchange resin localization. Partial localization of cationic ion exchange resin can happen when the uniformity of the mixture in the resin bed collapses during the resin bed construction process due to the difference of sedimentation velocity of ion exchange resins. Localization of cation exchange resin can increase the risk of side-reactions such as hydrolysis during the purification of the solvents, because proton released from cation exchange reaction is active until being neutralized, and the generated impurities are not reversible even after protons are deactivated. Weak-acid cationic ion exchange resin can reduce the risk of hydrolysis, even if localization happens.

The distribution of bead size of the weak-acid cationic ion exchange resin and the weak-base anionic ion exchange resin includes, for example, a bead size of from 100 μm to 2,000 μm in one embodiment, from 200 μm to 1,000 μm, in another embodiment, and from 400 μm to 700 μm in still another embodiment. In one embodiment, the pore size of an MR-type ion exchange resin beads includes, for example, a pore size of from 1 nm to 2,000 nm. In the case of a gel-type resin, the pore size of the beads includes, for example, a pore size of from 0.01 angstroms to 20 angstroms in one embodiment.

The blend ratio of an ion exchange resin combination of a MR-type weak-acid cationic ion exchange resin and an MR-type weak-base anionic ion exchange resin includes, for example, a blend ratio of from 1:9 to 9:1 in volume (or in chemical equivalency) in one embodiment; and from 3:7 to 7:3 in another embodiment. In a preferred embodiment, the blend ratio of the cation exchange resin:anion exchange resin is 5:5. If a blend ratio of cation:anion exchange resin above 9:1 is used or if a blend ratio of cation:anion exchange resin below 1:9 is used, the metal removal rate will be depressed significantly.

The ion exchange resin mixture of the present invention based on an MR type weak-acid cationic ion exchange resin and an MR type weak-base anionic ion exchange resin for metal removal of (1) a hydrophilic organic solvent, (2) a hydrolysable organic solvent, or (3) a mixture of a hydrophilic organic solvent and a hydrolysable organic solvent exhibits one or more benefits including, for example, (1) one resin formulation can be commonly used for any ratio of hydrophilic solvent and hydrolysable solvent; (2) a high metal removal efficiency can be achieved; (3) the generation of organic impurities can be avoided; (4) for the case of PGME, purity loss observed in cation exchanged PGME does not happen in a mixed resin treatment; and/or (5) for the case of PGMEA, hydrolysis decomposition that causes purity loss can be avoided. "Purity loss" is measured by conventional methods such as by gas chromatography-flame ionization detector (GC-FID); and the color property of the solvent is not adversely impacted by the ion exchange process, i.e., the color of the solvent does not increase by using the ion exchange resins of the present invention. "Color" is measured, for example, by using a Pt—Co colorimeter and the method described in ASTM D5386.

In a broad embodiment, a process for removing ionic contaminants from organic solvents, includes the steps of (a) preparing a mixed bed of ion exchange resin comprising a cationic ion exchange resin and an anionic ion exchange resin, wherein the cationic ion exchange resin is a weak-acid cationic ion exchange resin; and wherein the anionic ion exchange resin is a weak-base anionic ion exchange resin, and (b) contacting (1) a hydrophilic organic solvent, (2) a hydrolysable organic solvent, or (3) a mixture of a hydrophilic organic solvent and a hydrolysable organic solvent with the mixed bed of ion exchange resin of step (a).

When contacting an organic solvent with a mixed bed of ion exchange resin, any known conventional methods for contacting liquids with ion exchange resins can be used. For example, a mixed bed of ion exchange resin can be packed in a column and the solvent can be poured from the top of the column through the mixed bed of ion exchange resin. In the contacting step (b) of the process, the flow rate of the solvent passing through the mixed resin bed can be, for example, from 1 BV/hr to 100 BV/hr in one embodiment and from 1 BV/hr to 50 BV/hr in another embodiment. If the flow rate of the solvent passing through the mixed resin bed is above 100 BV/hr, the metal removal rate will decrease; and if the flow rate of the solvent passing through the mixed resin bed is below 1 BV/hr, the purification productivity will decrease; otherwise, a large resin bed will be required to achieve target production throughput. As used herein, "BV" means bed volume, and refers to an amount of liquid contacted with the same amount of a hydrated wet mixed bed of ion exchange resin. For example, if 120 mL of a hydrated wet mixed bed of ion exchange resin is used, 1 BV means 120 mL of organic solvent is contacted with the mixed bed of ion exchange resin. "BV/hr" is calculated by flow rate (mL/hr) divided by bed volume (mL).

In general, the temperature of the process during step (b) of contacting an organic solvent with a mixed bed of ion exchange resin can include, for example, from 0° C. to 100° C. in one embodiment, from 10° C. to 60° C. in another embodiment, and from 20° C. to 40° C. in still another embodiment. If the temperature is above 100° C., the resin will be damaged; and if the temperature is below 0° C., some of the solvents to be treated may freeze.

The weak-acid cationic ion exchange resin and the weak-base anionic ion exchange resin useful in the present invention can originally contain water (swelled by water in equilibrium condition with water). Water functions as fuel for a hydrolysis reaction to occur under acidic conditions. Thus, in a preferred embodiment, water is removed from the ion exchange resins prior to solvent treatment. In one general embodiment, the content of water in the cationic ion exchange resin and the content of water in the anionic ion exchange resin is decreased to 10 wt % or less, respectively, (i.e., for each resin) prior to use; and to 5 wt % or less in each resin in another embodiment. In one embodiment, a general method to remove water from an ion exchange resin includes, for example, by solvation with a water miscible solvent. In carrying out the above method, a resin is immersed in a water miscible solvent until equilibrium is reached. Then, the resin is again immersed in fresh water miscible solvent. By repeating immersion of resin in water miscible solvent, water removal can be achieved. In another embodiment, a general method of removing water from ion exchange resin includes, for example, by drying the cationic ion exchange resin and the anionic ion exchange resin before contacting the ion exchange resins with an organic solvent. An apparatus of drying and conditions such as temperature, time and pressure for drying ion exchange resins can be selected using techniques known to those of skill in the art. For example, the ion exchange resins can be heated in an oven at a temperature of from 60° C. to 120° C. for a period of time of, for example, from 1 hr to 48 hr under decompressed condition. The content of water can be calculated by comparing the weight of an ion exchange resin before and after heating the resin at 105° C. for 15 hr.

Typically, the metal level of the feed solvent is lower than 1 ppb for most of the metal elements, while some of metal elements may be higher that 1 ppb, depending on various factors, for example, the solvent production process, the production facility, the storage facility and/or the packaging materials used.

In one general embodiment, the targeting metal level of a solvent, after the above-described ion-exchange resin treatment, is less than 50 ppt (part per trillion) when the feed solvent contains a typical metal level. The obtained organic solvent includes quite low-levels of metallic and non-metallic ionic contaminants. The metallic contaminants can include, for example, Na, K, Ca, Al, Fe, Ni, Zn, Cu, Sn and Cr. The concentration of each of these metallic contaminants can be 100 ppt or less, respectively, in various embodiments. Therefore, the organic solvents obtained using the process of the present invention can be useful in applications which requires an ultrapure solvent, such as for the manufacture of pharmaceuticals and electronic materials, and especially for use, for example, in semiconductor fabrication processes.

It is desired that the concentration of metallic and non-metallic ionic contaminants in the organic solvents processed through the process of the present invention (i.e., after ion-exchange treatment) be as low as possible. For example, in one general embodiment, the content of the metallic and non-metallic ionic contaminants in the organic solvents is zero ppt or at a level lower than the detection limit of a detection instrument (for example, close to zero such as 0.01 ppt depending on ICP-MS instrument model and metal element). In other embodiments, the metallic and non-metallic ionic contaminants in the organic solvents processed through the process of the present invention can be, for example less than 100 ppt in one embodiment, less than 50 ppt in another embodiment, and less than 20 ppt in still another embodiment. In other embodiments, some of the specific individual metal contaminants can be at a concentration level of less than 10 ppt. High removal rate of metals is necessary to achieve ultrapure solvent. In some embodiments, the ion exchange process of the present invention advantageously provides more than 90% of metal removal efficiency of the sum of 13 key metals with hydrophilic solvent, hydrolysable solvent, and a mixture thereof. When the metal removal efficiency is too low, less than 100 ppt of metal level cannot be achieved even if the metal level of the feed material is controlled to lower than 1 ppb.

It is also desired that the color of the organic solvents after ion-exchange treatment be as low as possible as measured by APHA method known in the art such as the method described in ASTM D5386. For example, in one general embodiment, the color of the organic solvents is zero or close to zero such as 0.1. In APHA color measurement, pure distilled water is used for zero adjustment. Each solvent has an inherent APHA color related to its chemical structure. The APHA color of a solvent available in the market is affected by trace impurities in the solvent. Carbonyl groups and peroxide groups can be color substances influencing APHA color for many organic solvents. If impurities are removed from the solvent, the desired inherent APHA color can be obtained. If impurities are generated by ion exchange process, the APHA color will generally increase. The inherent APHA color of most organic solvents is lower than 10, although there can be some exceptions. For example, in one embodiment, the color of the solvent is reduced by 5 in APHA scale after ion exchange; and in another embodiment, the color of the solvent is unchanged within +/−0.1 in the APHA color scale. In a preferred embodiment, the color of the solvent after ion-exchange treatment is less than 5 as measured by the APHA method It is also desired that the purity change of the solvent after ion-exchange treatment is as low as possible as measured by conventional methods such as by GC-FID. For example, in one general embodiment, the purity change of the organic solvents is zero percent (%) or at a level that is lower than the detection limit of a detection instrument (for example, close to zero % such as 0.000001% depending on the selection of the GC detector, selection of the column, and the selection of other measurement conditions). In other embodiments, the purity change of the solvent after ion-exchange treatment is, for example, less than 0.05% in one embodiment; and less than 0.01% in another embodiment.

EXAMPLES

Some embodiments of the present invention are described in detail in the following Examples. However, the following examples are presented to further illustrate the present invention in detail but are not to be construed as limiting the scope of the claims. Unless otherwise indicated, all parts and percentages are by weight.

Various terms and designations used in the Inventive Examples (Inv. Ex.) and the Comparative Examples (Comp. Ex.) are explained as follows:
"DVB" stands for divinyl benzene.
"MR" stands for macroreticular.
"BV/hr" stands for bed volume/hour(s).
"WAC" stands for weak-acid cationic ion exchange resin, with the same meaning as weak cation exchange resin
"WBA" stands for weak-base anionic ion exchange resin, with the same meaning as weak anion exchange resin.
"SAC" stands for strong-acid cationic ion exchange resin, with the same meaning as strong cation exchange resin.
"SBA" stands for strong-base anionic ion exchange resin, with the same meaning as strong anion exchange resin.

Various raw materials or ingredients used in the Examples are explained as follows:
DOWEX™ MAC-3, AMBERLITE™ IRC76, DOWEX™ MONOSPHERE 650C UPW, AMBERLITE™ IRA98, AMBERJET™ UP4000, AMBERJET™ 9000 OH, and AMBELITE™ IRA904 Cl are ion exchange resins and described in Tables I and II; and these ion exchange resins are available from Dupont.
DOWANOL™ PM, propylene glycol methyl ether (PGME), a solvent available from The Dow Chemical Company.
DOWANOL™ PMA, propylene glycol methyl ether acetate (PGMEA), a solvent available from The Dow Chemical Company.
"Ultrapure water", as used in the Examples, means high-purity water that has been made as close as possible to $H_2O$ by water treatment technologies. The water is processed to an ultra-high level of purity by removing not only solid substances and salts, but also gas dissolved in the water. The electric resistivity ratio of theoretically pure water is 18.24 MΩ cm, and ultrapure water has been made as close as possible to this level.

TABLE I

Cation Ion Exchange Resins

| Ion exchange resin | DOWEX™ MAC-3 | AMBERLITE™ IRC76 | DOWEX™ MONOSPHERE 650C UPW |
|---|---|---|---|
| Matrix | MR type | MR type | Gel type |
| Matrix polymer | Polyacrylic | Polyacrylic | Styrene-DVB |
| Functional group | Weak cation Carboxylic acid-COOH | Weak cation Carboxylic acid-COOH | Strong cation Sulfonic acid-$SO_3H$ |
| Moisture retention capacity | 44%-52% | 52%-58% | 44%-51% |
| Harmonic mean diameter | 300 μm-1200 μm | 500 μm-750 μm | 600 μm-700 μm |

TABLE II

Anion Ion Exchange Resins

| Ion exchange resin | AMBERLITE™ IRA98 | AMBERJET™ UP4000 | AMBERJET™ 9000 OH | AMBELITE™ IRA904 Cl (converted to OH−) |
|---|---|---|---|---|
| Matrix | MR type | Gel type | MR type | MR type |
| Matrix polymer | Styrene-DVB | Styrene-DVB | Styrene-DVB | Styrene-DVB |
| Functional group | Weak anion Tertiary amine: —$N(CH_3)_2$ | Strong anion Type I Quaternary ammonium: —$N^+(CH_3)_3$•$OH^-$ | Strong anion Type I Quaternary ammonium: —$N^+(CH_3)_3$•$OH^-$ | Strong anion Type I Quaternary ammonium: —$N^+(CH_3)_3$•$OH^-$ |

TABLE II-continued

| | Anion Ion Exchange Resins | | | |
|---|---|---|---|---|
| Ion exchange resin | AMBERLITE™ IRA98 | AMBERJET™ UP4000 | AMBERJET™ 9000 OH | AMBELITE™ IRA904 Cl (converted to OH⁻) |
| Moisture retention capacity | 54%-63% | 54%-60% | 66%-75% | 57%-63% |
| Harmonic mean diameter | 490 μm-690 μm | 580 μm-680 μm | 580 μm-700 μm | 530 μm-730 μm |

TABLE III

| | Inventive Examples | | | |
|---|---|---|---|---|
| | Resin Formulation | Resin Type | Resin Morphology | Flowed Solvent |
| Example 1-a | 1:1 volume mix of AMBERLITE™ IRC76 and AMBERLITE™ IRA98 | WAC/WBA | MR/MR | DOWANOL™ PM |
| Example 1-b | 1:1 volume mix of DOWEX™ MAC-3 and AMBERITE™ IRA98 | WAC/WBA | MR/MR | DOWANOL™ PMA |
| Example 2 | 1:1 volume mix of AMBERLITE™ IRC76 and AMBERLITE™ IRA98 | WAC/WBA | MR/MR | 7/3 mix of DOWANOL™ PM and DOWANOL™ PMA |
| Example 3 | 1:1 mix based on chemical equivalency of DOWEX™ MAC-3 and AMBERLITE™ IRA98 | WAC/WBA | MR/MR | DOWANOL™ PMA |

Example 1-a—1:1 Volume Ratio Mixed Resin Bed with AMBERLITE™ IRC76 and AMBERLITE™ IRA98 for DOWANOL™ PM, Propylene Glycol Monomethyl Ether In this Example 1-a, 50 mL of hydrated state AMBERLITE™ IRC76 resin and 50 mL of AMBERLITE™ IRA98 resin were mixed. After 12 hr of ultrapure water flow at 4 BV/hr, the washed mixed resin was dried in a vacuum oven (at 50° C., 10 mmHg, and 24 hr). The dried mixed resin was charged to a Teflon column with an internal diameter of 50 mm and a length of 150 mm. A total of 2 L of DOWANOL™ PM was flowed through the column at 2 BV/hr for water displacement. Then, sampling was started at 4 BV/hr flow rate, varying the flow rate.

Example 1-b—1:1 Volume Ratio Mixed Resin Bed with DOWEX™ MAC-3 and AMBERLITE™ IRA98 for DOWANOL™ PMA, Propylene Glycol Monomethyl Ether Acetate In this Example 1-b, 50 mL of hydrated state DOWEX™ MAC-3 resin and 50 mL of AMBERLITE™ IRA98 resin were mixed. After 12 hr of ultrapure water flow at 4 BV/hr, the washed mixed resin was dried in a vacuum oven (at 50° C., 10 mmHg, and 24 hr). The dried mixed resin was charged to a Teflon column with an internal diameter of 20 mm and a length of 500 mm. A total of 2 L of DOWANOL™ PMA was flowed through the column at 2 BV/hr for solvation. Then, sampling was started at 4 BV/hr flow rate, varying the flow rate.

Example 2—1:1 Volume Ratio Mixed Resin Bed with AMBERLITE™ IRC76 and AMBERLITE™ IRA98 of Example 1 for Solvent Mixture In this Example 2, 50 mL of hydrated state AMBERLITE™ IRC76 resin and 50 mL of AMBERLITE™ IRA98 resin were mixed. After 12 hr of ultrapure water flow at 4 BV/hr, the mixed resin was dried in a vacuum oven (at 50° C., 10 mmHg, and 24 hr). The dried mixed resin was charged to a Teflon column with internal diameter of 50 mm and a length of 150 mm. A total of 3 L solvent mixture of DOWANOL™ PM and DOWANOL™ PMA was flowed through the column at 2 BV/hr for water displacement. Then, sampling was started at 4 BV/hr flow rate, varying the flow rate.

Example 3—Stoichiometrically Mixed Resin Bed with DOWEX™ MAC-3 and AMBERLITE™ IRA98 of Example 1 for DOWANOL™ PMA In this Example 3, 31 mL of hydrated wet DOWEX™ MAC-3 and 89 mL of hydrated wet AMBERLITE™ IRA98 were mixed. The mix resin was placed in a vacuum oven at 60° C. and 20 mmHg for a period of 15 hr to prepare a dry resin. The dry resin was charged into a Teflon column. DOWANOL™ PMA solvent was flowed through the column at 8 mL/min for 8 hr. Then, sampling was started at 4 BV/hr flow rate, varying the flow rate.

TABLE IV

Comparative Examples

| Resin Formulation | Resin Type | Resin Morphology | Flowed Solvent |
|---|---|---|---|
| Comparative Example A | DOWEX™ MONOSPHERE™ 650C UPW | Single SAC | Gel | PM |
| Comparative Example B1 | DOWEX™ MAC-3 | Single WAC | MR | PM |
| Comparative Example B2 | | | | PMA |
| Comparative Example C1 | Stoichiometrically Mixed Resin bed of AMBERJET™ 1024 UP H and AMBERJET™ UP4000 | SAC/SBA | Gel/Gel | PM |
| Comparative Example C2 | | | | PMA |
| Comparative Example D | 1:1-Volume ratio Mixed Resin Bed with AMBERJET™1024 and AMBERLITE™ IRA98 | SAC/WBA | MR/MR | PMA |

Comparative Example A—DOWEX™ MONOSPHERE™ 650C UPW for DOWANOL™ PM

In this Comparative Example A, 120 mL of hydrated state DOWEX™ MONOSPHERE™ 650C UPW resin was charged to a Teflon column with an internal diameter of 20 mm and a length of 500 mm. DOWANOL™ PM (PM) was flowed through the column at 40 mL/min for 3 hr for water displacement with PM. Then, sampling was started, varying the flow rate.

Comparative Example B1—DOWEX™ MAC-3 for DOWANOL™ PM

In this Comparative Example B1, 120 mL of hydrated state DOWEX™ MAC-3 resin was charged to a Teflon column with an internal diameter of 20 mm and a length of 500 mm. After water was displaced with PM flowed through the column for 6 hours at 16 BV/hr, samples were taken at various flow rates.

Comparative Example B2—DOWEX™ MAC-3 for DOWANOL™ PMA

Using the resin bed of Comparative Example B1, DOWANOL™ PMA was flowed through the column at 16 BV/hr for 3 hr for displacement of DOWANOL™ PM with DOWANOL™ PMA. Then, samples were taken at various flow rates.

Comparative Example C1—Stoichiometrically Mixed Resin Bed of AMBERJET™ 1024 UP H and AMBERJET™ UP4000 for DOWANOL™ PM In this Comparative Example C1, 43 mL of hydrated wet cation exchange resin AMBERJET™ 1024 UP H and 77 mL of hydrated wet anion exchange resin AMBERJET™ UP4000 were mixed as 1:1 chemical equivalent ratio. Then, 120 mL of the resulting mix resin was loaded into a Teflon column. DOWANOL™ PM solvent (propylene glycol monomethyl ether, PGME) was flowed through the column for 6 hr at 16 BV/hr to displace water with DOWANOL™ PM. Then, samples were taken at various flow rates.

Comparative Example C2—Stoichiometrically Mixed Resin Bed of AMBERJET™ 1024 UP H and AMBERJET™ UP4000 for DOWANOL™ PMA Using the resin bed of Comparative Example C1, DOWANOL™ PMA was flowed through the column at 7.5 BV/hr for 8 hr for displacement of PM with PMA. Then, samples were taken at various flow rates.

Comparative Example D—1:1 Volume Mix of Gel-Type Strong-Acid Cationic Ion Exchange Resin AMBERJET™ 1024UP H and MR-Type Weak-Base Anionic Ion Exchange Resin AMBERITE™ for DOWANOL™ PM In this Comparative Example D, 60 mL of hydrated AMBERJET™ 1024UP H and 60 mL of hydrated AMBERLITE™IRA98 were mixed and then dried in a vacuum oven at 60° C. and at 20 mmHg for 15 hr. Then, the mix resin was charged to a 150 mL Teflon column. DOWANOL™ PMA was encapsulated in the column for 24 hr for solvation. Then, the DOWANOL™ PMA was preflowed through the column for 5 hr at 16 BV/hr before a sample was taken.

Test Methods

Metal Test

The concentrations of metals in the solvent samples are analyzed by conventional equipment such as an ICP-MS (Inductively Coupled Plasma-mass spectrometry) instrument available from Agilent Technology; and the analytical results are described in the tables which follows herein below. Original metal level (concentration) and metal element ratio are varied by feed solvent lot.

Purity and Impurity Analysis

For DOWANOL™ PM, the concentration of 1-methoxy-2-propanol and impurities were analyzed with GC-FID (Gas chromatography-flame ionization detector); and the results are described in the Tables of the Discussion of Results section which follows herein below. The definition of "purity" is area % of 1-methoxy-2-propanol in the GC analysis. And, 2-methoxy-1-propanol is a beta-isomer present in DOWANOL™ PM.

For DOWAMNOL™ PMA, the concentration of 1-methoxy-2-propyl acetate and impurities were analyzed with GC-FID; and the results are described in the Tables of the Discussion of Results section which follows herein below. The definition of "purity" is area % of 1-methoxy-2-propyl acetate. And, 2-methoxy-1-propyl acetate is a beta-isomer present in DOWANOL™ PMA. For the case of DOWANOL™ PMA, acetic acid and 1-methoxy-2-propanol are generated in the same mole ratio as the results of hydrolysis decomposition. Since acetic acid is not detected with typical GC conditions, amount of 1-methoxy-e-propanol generated by ion exchange process was used as an indicator of degree of hydrolysis decomposition.

Color Test

Color of DOWANOL™ PM, encapsulated in the ion exchange column for one day, was evaluated based on the standard method described in ASTM D5386.

Metal and Purity Test Results

Using a mixed resin bed with a weak-acid cationic ion exchange resin and a weak-base anionic ion exchange resin, AMBERLITE™ IRC76 and AMBERLITE™ IRA98, respectively, a significantly low metal residual in DOWANOL™ PM is obtained without any purity loss and impurity increase (as described in Example 1-a of Table V). And, similar formulation mixture of DOWEX™ MAC-3 and AMBERLITE™ IRA98 also was able to remove metals effectively from DOWANOL™ PMA without purity loss and impurity increase (as described in Example 1-b of Table V). With the use of the mix resin of AMBERITE™ IRC76 and AMBERLITE™ IRA98, significantly low metal residue in a blend of DOWANOL™ PM and DOWANOL™ PMA (as described in Example 3 of Table VI) could be obtained without purity and impurity change. After treated by the mixed ion-exchange resin, all of the metal contents can be controlled within a 50 ppt level. Many of the metal contents were lower than 10 ppt.

In order to treat mix solvents of hydrophilic solvent and hydrolysable solvent, the ion exchange resin bed has to have the capability of removing metal from each solvent without chemical damage. Example 1-a and Example 1-b described in Table V show that the mixed ion exchange resin of the present invention is effective to both a hydrophilic solvent and a hydrolysable solvent.

Table VII is the example data when mix ratio of weak-acid cationic ion exchange resin and weak-base anionic ion exchange resin was changed to 1:3 in volume ratio. Equivalent performance to Example 1-b (1:1 in volume ratio) was confirmed.

However, using other ion-exchange resin combinations, as described in the Comparative Examples (see Tables VIII-X), less than 0.1 ppb metal content is challenging to achieve. Also, purity loss was observed.

The single cation exchange resin showed a less effective metal removal capability; and a significant purity loss was observed. As shown in Comparative example A described in Table VIII, a strong cation exchanged DOWANOL PM lost purity significantly.

As shown in Comparative Example B described in Table IX, a weak-acid cationic ion exchange resin bed could barely remove metals from either DOWANOL™ PM or DOWANOL™ PMA. And, purity loss of the solvents by using the weak-acid cationic ion exchange resin is not as obvious as in the case of the strong cation exchanged resins (see Comparative Example A). However, a level of impurity increase was not negligible in this Comparative Example B; and the impurity increase level is still unacceptable for specific desired applications. Based on the results of the Examples and Comparative Examples, it has been found that a weak-acid cation exchange resin works effectively in a metal removal process when the weak-acid cationic ion exchange resin is mixed with a weak-base anionic ion exchange resin.

As shown in Comparative example C1 described in Table X, a mixed bed of a strong-acid cation exchange resin and a strong-base anion exchange resin can remove metal from DOWANOL™ PM in a satisfactory efficient way without purity loss. However, the resin of Comparative example C1 is not useful for removing metal from hydrolysable solvent such as DOWANOL™ PMA. As indicated in Comparative Example C2 described in Table X, metal removal from DOWANOL™ PMA was not as good as the Example 1-b described in Table V. Also, an obvious purity loss and an increase of 1-methoxy-2 propanol as hydrolysis decomposition products were observed with DOWANOL™ PMA.

To treat mixed solvents of hydrophilic solvent and hydrolysable solvent, the ion exchange resin bed used to treat the mixed solvents has to have the capability of metal removal from each component solvent without chemical damage to the solvent. Also, it can be reasoned by analogy that a mixed resin of a strong-acid cation exchange resin and a strong-base anion exchange resin is not suitable for treating mixed solvents containing hydrolysable solvents.

High metal removal efficiency was observed in Comparative example D described in Table XI, however, it was found that trace level of 1-methoxy-2-propanol was generated through the ion exchange as the results of miner hydrolysis, although such trace level of increment of 1-methoxy-2-propanol may be acceptable in a certain application. The miner level of hydrolysis is assumed to have come from localization of strong-acid cation exchange resin in the mixed resin column. The weak-acid cationic ion exchange resin has the same probability of localization occurrence, however, as showing in Table IX, weak-acid cationic ion exchange resin does not cause hydrolysis of DOWANOL™ PMA as significant as strong-acid cation exchange resin, shown as Comparative example A in Table VIII. Even localization of the cation exchange resin, risk of hydrolysis can be neglected when weak-acid cationic ion exchange resin is used in the mixed bed.

The following Table V describes the results of ion exchange treatment of solvents, DOWANOL™ PM and DOWANOL™ PMA, with a 1:1 volume solvent mixture of a MR type weak-acid cationic ion exchange resin and a MR type weak-base anionic ion exchange resin.

TABLE V

Evaluation Results of Examples 1-a and 1-b

| Item | Example 1-a-Mixed Resin Bed with AMBERLITE ™ IRC76 and AMBERLITE ™ IRA98 Metal (ppb) in DOWANOL ™ PM | | | Example 1-b-Mixed Resin Bed with DOWEX MAC-3 and AMBERLITE ™ IRA98 Metal (ppb) in DOWANOL ™ PMA | | |
|---|---|---|---|---|---|---|
| | Original | 4 BV/hr | 12 BV/hr | Original | 4 BV/hr | 16 BV/hr |
| Na | 0.78 | 0.02 | 0.04 | 0.09 | 0.01 | 0.01 |
| Fe | 2.52 | 0.01 | 0.02 | 0.20 | 0.02 | 0.03 |
| K | 1.59 | 0.00 | 0.01 | 0.02 | 0.00 | 0.00 |
| Ca | 0.87 | 0.01 | 0.01 | 0.02 | 0.01 | 0.00 |
| Cu | 0.04 | 0.00 | 0.00 | 0.02 | 0.00 | 0.00 |
| Mg | 0.02 | 0.00 | 0.00 | 0.03 | 0.00 | 0.00 |
| Mn | 0.02 | 0.00 | 0.00 | 0.01 | 0.00 | 0.00 |
| Al | 0.01 | 0.00 | 0.00 | 0.00 | 0.00 | 0.01 |
| Cr | 0.00 | 0.00 | 0.00 | 0.06 | 0.01 | 0.00 |
| Ni | 0.03 | 0.00 | 0.00 | 0.02 | 0.00 | 0.00 |
| Pb | 0.01 | 0.00 | 0.01 | 0.01 | 0.00 | 0.00 |

TABLE V-continued

Evaluation Results of Examples 1-a and 1-b

| | Example 1-a-Mixed Resin Bed with AMBERLITE ™ IRC76 and AMBERLITE ™ IRA98 Metal (ppb) in DOWANOL ™ PM | | | Example 1-b-Mixed Resin Bed with DOWEX MAC-3 and AMBERLITE ™ IRA98 Metal (ppb) in DOWANOL ™ PMA | | |
|---|---|---|---|---|---|---|
| Item | Original | 4 BV/hr | 12 BV/hr | Original | 4 BV/hr | 16 BV/hr |
| Zn | 5.34 | 0.01 | 0.02 | 0.48 | 0.02 | 0.03 |
| Li | 0.01 | 0.00 | 0.00 | 0.00 | 0.00 | 0.00 |
| Sum of 13 metals | 11.24 | 0.05 | 0.11 | 0.96 | 0.07 | 0.08 |
| Metal removal % | — | >99% | 99% | — | 93% | 92% |
| Purity | 99.91% | 99.91% | 99.91% | 99.94% | 99.94% | 99.94% |
| 1-methoxy-2-propanol | 99.91% | 99.91% | 99.91% | 0.000% | 0.000% | 0.000% |
| 1-methoxy-2-propyl acetate | 0.000% | 0.000% | 0.000% | 99.94% | 99.94% | 99.94% |
| 2-methoxy-1-propanol | 0.048% | 0.048% | 0.048% | 0.000% | 0.000% | 0.000% |
| 2-methoxy-1-propyl acetate | 0.000% | 0.000% | 0.000% | 0.052% | 0.052% | 0.052% |
| Other impurities | 0.042% | 0.042% | 0.042% | 0.007% | 0.007% | 0.007% |

The following Table VI describes the results treating a solvent mixture with a mixture of a MR type weak-acid cationic ion exchange resin and a MR type weak-base anionic ion exchange resin.

TABLE VI

Evaluation Results of Example 2
Example 2
Stoichiometrically Mixed Resin Bed with AMBERLITE ™ IRC76 and AMBERLITE ™ IRA98

| | Metal (ppb) in Mixture of DOWANOL ™ PM and DOWANOL ™ PMA | | |
|---|---|---|---|
| Item | Original | 4 BV/hr | 12 BV/hr |
| Na | 3.30 | 0.00 | 0.02 |
| Fe | 1.60 | 0.00 | 0.00 |
| K | 1.51 | 0.00 | 0.00 |
| Ca | 1.11 | 0.00 | 0.00 |
| Cu | 0.06 | 0.00 | 0.00 |
| Mg | 0.07 | 0.00 | 0.02 |
| Mn | 0.03 | 0.00 | 0.00 |
| Al | 0.01 | 0.00 | 0.00 |
| Cr | 0.01 | 0.00 | 0.00 |
| Ni | 0.02 | 0.00 | 0.00 |
| Pb | 0.01 | 0.00 | 0.01 |
| Zr | 3.90 | 0.00 | 0.02 |
| Li | 0.00 | 0.00 | 0.00 |
| Sum of 13 metals | 11.63 | 0.00 | 0.07 |
| Metal removal % | | ~100% | >99% |
| Purity, (sum of 1-methoxy-2-propanol + 1-methoxy-2-propylacetate) | 99.91% | 99.91% | 99.91% |
| Isomer content, 2-methoxy-1-propanol | 0.036% | 0.035% | 0.035% |
| Isomer content, 2-methoxy-1-propylacetate | 0.016% | 0.016% | 0.016% |
| Other impurities | 0.038% | 0.039% | 0.039% |

The following Table VII describes the results of treating a solvent DOWANOL™ PMA with a stoichiometric mixture of a MR type weak-acid cationic ion exchange resin and a MR type weak-base anionic ion exchange resin.

TABLE VII

Evaluation Results of Example 3
Example 3
Stoichiometric Mixed Resin Bed with DOWEX ™ MAC-3 and AMBERLITE ™ IRA98

| | Metal (ppb) in DOWANOL ™ PM | | |
|---|---|---|---|
| Item | Original | 4 BV/hr | 16 BV/hr |
| Na | 0.03 | 0.01 | 0.00 |
| Fe | 0.19 | 0.03 | 0.03 |
| K | 0.01 | 0.00 | 0.00 |
| Ca | 0.01 | 0.00 | 0.00 |
| Cu | 0.02 | 0.00 | 0.00 |
| Mg | 0.03 | 0.00 | 0.00 |
| Mn | 0.00 | 0.00 | 0.00 |
| Al | 0.01 | 0.01 | 0.00 |
| Cr | 0.01 | 0.00 | 0.01 |
| Ni | 0.01 | 0.00 | 0.00 |
| Pb | 0.00 | 0.00 | 0.00 |
| Zr | 0.32 | 0.01 | 0.01 |
| Li | 0.00 | 0.00 | 0.00 |
| Sum of 13 metals | 0.64 | 0.06 | 0.05 |
| Metal removal % | | 91% | 92% |
| Purity, 1-methoxy-2-propyl acetate | 99.91% | 99.91% | 99.91% |
| 1-methoxy-2-propanol | 0.053% | 0.053% | 0.053% |
| 2-methoxy-1-propanol | 0.000% | 0.000% | 0.000% |
| 2-methoxy-1-propyl acetate | 0.014% | 0.014% | 0.014% |
| Other impurities | 0.026% | 0.026% | 0.026% |

TABLE VIII

Evaluation Results of Comparative Example A
Comparative Example A—
DOWEX ™ MONOSPHERE ™ 650C UPW

| | Metal (ppb) in DOWANOL ™ PM | | | |
|---|---|---|---|---|
| Item | Original | 8 BV/hr | 16 BV/hr | 32 BV/hr |
| Na | 2.48 | 1.28 | 0.77 | 1.00 |
| Fe | 1.27 | 0.11 | 0.07 | 0.07 |
| K | 0.73 | 0.28 | 0.18 | 0.10 |
| Ca | 0.06 | 0.44 | 0.16 | 0.05 |
| Cu | 0.05 | 0.09 | 0.07 | 0.05 |
| Mg | 0.32 | 0.30 | 0.20 | 0.15 |
| Mn | 0.02 | 0.02 | 0.02 | 0.01 |
| Al | 0.07 | 0.08 | 0.07 | 0.14 |
| Cr | 0.11 | 0.05 | 0.04 | 0.04 |

TABLE VIII-continued

Evaluation Results of Comparative Example A
Comparative Example A—
DOWEX ™ MONOSPHERE ™ 650C UPW

| | Metal (ppb) in DOWANOL ™ PM | | | |
|---|---|---|---|---|
| Item | Original | 8 BV/hr | 16 BV/hr | 32 BV/hr |
| Ni | 0.05 | 0.06 | 0.03 | 0.03 |
| Pb | 0.00 | 0.01 | 0.00 | 0.00 |
| Zn | 0.33 | 0.36 | 0.14 | 0.10 |
| Li | 0.01 | 0.01 | 0.01 | 0.01 |
| Sum of 13 metals | 5.51 | 3.08 | 1.76 | 1.76 |
| Metal removal % | | 44% | 68% | 68% |

| | Metal (ppb) in DOWANOL ™ PM | | | |
|---|---|---|---|---|
| Item | Original | 8 BV/hr | 16 BV/hr | 32 BV/hr |
| | GC Analysis | | | |
| Purity, 1-methoxy-2-propanol | | 99.93% | | 99.92% |
| 2-methoxy-1-propanol | | 0.050% | | 0.049% |
| Other Impurities | | 0.018% | | 0.031% |

TABLE IX

Evaluation Results of Comparative Example B

| | Comparative Example B-1 DOWEX ™ MAC-3 Metal (ppb) of DOWANOL ™ PM | | | Comparative Example B-2 DOWEX ™ MAC-3 Metal (ppb) in DOWANOL ™ PMA | | |
|---|---|---|---|---|---|---|
| Item | Original | 16 BV/hr | 4 BV/hr | Original | 16 BV/hr | 4 BV/hr |
| Na | 5.66 | 5.38 | 5.45 | 0.03 | 0.0.4 | 0.04 |
| Fe | 0.49 | 0.42 | 0.39 | 0.10 | 0.07 | 0.05 |
| K | 0.51 | 0.32 | 0.34 | 0.16 | 0.16 | 0.18 |
| Ca | 0.91 | 0.32 | 0.52 | 0.02 | 0.01 | 0.01 |
| Cu | 0.02 | 0.01 | 0.02 | 0.09 | 0.08 | 0.08 |
| Mg | 0.18 | 0.05 | 0.18 | 0.03 | 0.02 | 0.01 |
| Mn | 0.02 | 0.01 | 0.02 | 0.01 | 0.02 | 0.01 |
| Al | 0.00 | 0.02 | 0.02 | 0.09 | 0.11 | 0.09 |
| Cr | 6.96 | 6.32 | 7.22 | 0.05 | 0.04 | 0.03 |
| Ni | 0.02 | 0.01 | 0.02 | 0.01 | 0.01 | 0.01 |
| Pb | 0.01 | 0.00 | 0.01 | 0.00 | 0.04 | 0.00 |
| Zn | 1.10 | 0.12 | 1.60 | 0.35 | 0.25 | 0.22 |
| Li | 0.00 | 0.00 | 0.00 | 0.01 | 0.00 | 0.01 |
| Sum of 13 metals | 15.88 | 12.98 | 15.79 | 0.95 | 0.81 | 0.74 |
| Metal removal % | | 18% | 1% | | 15% | 22% |
| GC Analysis | | | | | | |
| Purity | 99.81% | 99.73% | 99.73% | 99.92% | 99.92% | 99.90% |
| 1-methoxy-2-propanol | 99.82% | 99.73% | 99.73% | 0.001% | 0.007% | 0.018% |
| 1-methoxy-2-propyl acetate | 0.000% | 0.000% | 0.000% | 99.92% | 99.92% | 99.90% |
| 2-methoxy-1-propanol | 0.052% | 0.052% | 0.053% | 0.000% | 0.000% | 0.000% |
| 2-methoxy-1-propyl acetate | 0.000% | 0.000% | 0.000% | 0.072% | 0.071% | 0.072% |
| Other impurities | 0.128% | 0.219% | 0.212% | 0.005% | 0.006% | 0.009% |

The following Table X describes the results of treating solvents with a mixed resin of a gel type strong-acid cationic ion exchange resin and gel type weak-base anionic ion exchange resin.

TABLE X

Evaluation Results of Comparative Example C

Stoichiometric mixture of DOWEX ™ Monosphere 650C and AMBERJET ™ UP4000

| | Comparative Example C-1 Metals (ppb) in DOWANOL ™ PM | | | | Comparative Example C-2 Metals (ppb) in DOWANOL ™ PMA | | | |
|---|---|---|---|---|---|---|---|---|
| Item | Original | 32 BV/hr | 16 BV/hr | 8 BV/hr | Original | 12 BV/hr | 6 BV/hr | 2 BV/hr |
| Na | 2.21 | 0.05 | 0.05 | 0.04 | 0.02 | 0.01 | 0.01 | 0.01 |
| Fe | 2.99 | 0.78 | 0.32 | 0.12 | 0.06 | 0.02 | 0.01 | 0.02 |
| K | 0.08 | 0.06 | 0.05 | 0.02 | 0.10 | 0.10 | 0.02 | 0.09 |
| Ca | 0.41 | 0.04 | 0.03 | 0.05 | 0.01 | 0.01 | 0.09 | 0.01 |
| Cu | 0.01 | 0.00 | 0.00 | 0.00 | 0.03 | 0.03 | 0.01 | 0.02 |
| Mg | 0.22 | 0.05 | 0.02 | 0.01 | 0.07 | 0.01 | 0.02 | 0.01 |
| Mn | 0.02 | 0.00 | 0.00 | 0.00 | 0.00 | 0.00 | 0.01 | 0.00 |
| Al | 0.02 | 0.01 | 0.01 | 0.00 | 0.14 | 0.15 | 0.14 | 0.14 |

TABLE X-continued

Evaluation Results of Comparative Example C

Stoichiometric mixture of DOWEX ™ Monosphere 650C and AMBERJET ™ UP4000

| | Comparative Example C-1 Metals (ppb) in DOWANOL ™ PM | | | | Comparative Example C-2 Metals (ppb) in DOWANOL ™ PMA | | | |
|---|---|---|---|---|---|---|---|---|
| Item | Original | 32 BV/hr | 16 BV/hr | 8 BV/hr | Original | 12 BV/hr | 6 BV/hr | 2 BV/hr |
| Cr | 0.27 | 0.05 | 0.02 | 0.01 | 0.04 | 0.01 | 0.01 | 0.01 |
| Ni | 0.03 | 0.01 | 0.01 | 0.01 | 0.02 | 0.01 | 0.01 | 0.01 |
| Pb | 0.00 | 0.00 | 0.00 | 0.00 | 0.01 | 0.00 | 0.00 | 0.00 |
| Zn | 0.43 | 0.06 | 0.02 | 0.01 | 0.42 | 0.08 | 0.09 | 0.11 |
| Li | 0.00 | 0.00 | 0.00 | 0.00 | 0.02 | 0.02 | 0.01 | 0.01 |
| Sum of 13 metals | 6.69 | 1.11 | 0.53 | 0.27 | 0.94 | 0.45 | 0.43 | 0.44 |
| Metal removal % | | 83% | 92% | 96% | | 52% | 54% | 53% |
| Purrity (%) | 99.90% | — | — | 99.90% | 99.92% | 99.90% | 99.87% | 99.75% |
| 1-methoxy-2-propanol | 99.90% | — | — | 99.90% | 0.001% | 0.026% | 0.054% | 0.164% |
| PGME isomer (2-methoxy-1-propanol) | 0.067% | — | — | 0.067% | 0.000% | 0.000% | 0.000% | 0.000% |
| PGMEA isomer (1-methoxy-2-propyl acetate) | 0.000% | — | — | 0.000% | 0.076% | 0.076% | 0.076% | 0.076% |
| Other impurities | 0.032% | — | — | 0.032% | 0.004% | 0.003% | 0.004% | 0.005% |

The following Table XI describes the results of treating a solvent, DOWANOL™ PMA, with a mixed resin of a gel type strong-acid cationic ion exchange resin and a MR type weak-base anionic ion exchange resin.

TABLE XI

Evaluation Results of Comparative Example D

| | Comparative Example D 1:1-Volume ratio Mixed Resin Bed with AMBERJET ™1024 and AMBERLITE ™ IRA98 Metal (ppb) in DOWANOL ™ PMA | |
|---|---|---|
| Item | Original | 16 BV/hr |
| Na | 0.05 | 0.00 |
| Fe | 0.33 | 0.05 |
| K | 0.01 | 0.00 |
| Ca | 0.02 | 0.01 |
| Cu | 0.06 | 0.01 |
| Mg | 0.02 | 0.00 |
| Mn | 0.00 | 0.00 |
| Al | 0.01 | 0.00 |
| Cr | 0.04 | 0.01 |
| Ni | 0.01 | 0.00 |
| Pb | 0.00 | 0.00 |
| Zn | 0.19 | 0.01 |
| Li | 0.00 | 0.00 |
| Sum of 13 metals | 0.74 | 0.09 |
| Metal removal % | | 88% |
| Purity, 1-methoxy-2-prolyl acetate | 99.91% | 99.90% |
| 1-methoxy-2-propanol | 0.000% | 0.003% |
| 2-methoxy-1-propyl acetate | 0.071% | 0.071% |

Color Test Results

Color testing of a solvent is carried out as described above using the method of ASTM D5386. The color of original DOWANOL™ PM without any purification; and the color of DOWANOL™ PM treated by ion-exchange resins is listed in Table XII. As described in Table XII, the ion-exchange resin used in Example 1-A reduces the color of DOWANOL™ PM from its original color compared to the other ion-exchange resins of Comparative Examples A and C which do not reduce the color of DOWANOL™ PM from its original color while the color of DOWANOL™ PM of Comparative Example B does not change.

TABLE XII

Color Results

| Example No. of Sample | Color, Pt-Co |
|---|---|
| Original | 5.7 |
| Example 1-A | <2.0 |
| Comparative Example A | 79.8 |
| Comparative Example B-1 | 5.9 |
| Comparative Example C-1 | 24.5 |

OTHER EMBODIMENTS

The process of the present invention can be carried out in various columns containing the weak-acid cationic ion exchange resin and the weak-base anionic ion exchange resin; and depending on the solvent to be purified, the flow rate of the solvent can vary. However, generally the flow rate of the solvent contacting the mixed bed of ion exchange resins is from 1 bed volume/hour to 100 bed volume/hour.

The process of the present invention can be carried out at a working temperature of from 0° C. to 100° C.

The process of the present invention can be carried out wherein the solvent ratio of hydrophilic and hydrolysable solvents can be from 1/99 to 99/1.

In other embodiments, the initial color of the solvent before treating the solvent with the ion exchange treatment desirably does not change; and various solvents may differ in initial color. In a preferred embodiment, and not to be limited thereby, the color of the solvent after ion-exchange treatment is less than 5 as measured by APHA method.

What is claimed is:

1. A process for purifying a mixture of a hydrophilic organic solvent and a hydrolysable organic solvent by removing ionic contaminants from the mixture of the hydrophilic and the hydrolysable organic solvent without increment of organic impurities, the process comprising contacting the mixture of hydrophilic and hydrolysable organic solvents with a mixed bed of ion exchange resin; wherein the mixed bed of ion exchange resin comprises a mixture of: (a) a weak-acid cationic ion exchange resin and (b) a weak-base anionic ion exchange resin.

2. The process of claim 1, wherein the ionic contaminants include metallic and non-metallic ionic contaminants.

3. The process of claim 1, wherein the weak-acid cationic ion exchange resin is a macroreticular type resin and the weak-base anionic ion exchange resin is a macroreticular type resin.

4. The process of claim 1, wherein the mixture of hydrophilic organic solvent and hydrolysable organic solvent is a mixture of propylene glycol mono methyl ether and propylene glycol mono methyl ether acetate and the ratio of propylene glycol mono methyl ether and propylene glycol mono methyl ether acetate can be 1/99 to 99/1.

5. The process of claim 1, wherein the combination of the macroreticular type weak-acid cationic ion exchange resin and the macroreticular type weak-base anionic ion exchange resin is a blend ratio of from 80:20 to 20:80 in chemical equivalency; and at the same time, is a blend ratio of from 80:20 to 20:80 in solvated volume.

6. The process of claim 1, wherein the metal contaminant level of the solvent after the solvent is subjected to ion-exchange resin treatment is less than 50 parts per trillion.

7. The process of claim 1, wherein the hydrolysable organic solvent is a compound having an ester bond.

8. A process for removing ionic contaminants from an organic solvent, comprising the steps of:
　(a) preparing a mixed bed of ion exchange resin comprising a cationic ion exchange resin and an anionic ion exchange resin, wherein the cationic ion exchange resin is a weak-acid cationic ion exchange resin; and wherein the anionic ion exchange resin is a weak-base anionic ion exchange resin, and
　(b) contacting a mixture of a hydrophilic organic solvent and a hydrolysable organic solvent with the mixed bed of ion exchange resin of step (a).

9. The process of claim 8, wherein the step (b) is conducted by flowing the mixture of a hydrophilic organic solvent and a hydrolysable organic solvent-organie in a column filled with the mixed bed of ion exchange resin.

10. The process of claim 9, wherein the flow speed of the organic solvent is from 1 bed volume/hour to 100 bed volume/hour.

\* \* \* \* \*